United States Patent [19]
Wally, Jr. et al.

[11] Patent Number: 5,341,192
[45] Date of Patent: Aug. 23, 1994

[54] FLOW CAMERA FOR LARGE DOCUMENT REPRODUCTIONS

[75] Inventors: Joseph H. Wally, Jr., Overland Park, Kans.; Herbert W. Pace, Kansas City, Mo.

[73] Assignee: Black & Veatch Architects, Inc., Kansas City, Mo.

[21] Appl. No.: 25,444

[22] Filed: Mar. 2, 1993

[51] Int. Cl.$^5$ .................. G03B 27/48; G03B 27/50
[52] U.S. Cl. ........................................ 355/50; 355/51
[58] Field of Search ................................. 355/50, 51

[56] References Cited

U.S. PATENT DOCUMENTS

| | | |
|---|---|---|
| 2,783,678 | 3/1957 | Andreas et al. |
| 3,119,301 | 1/1964 | Beattie et al. |
| 3,475,096 | 10/1969 | Ooue et al. |
| 3,480,365 | 11/1969 | Ooue et al. |
| 3,498,705 | 3/1970 | Ooue et al. |
| 3,579,338 | 5/1971 | Ooue et al. |
| 3,741,647 | 6/1973 | Harris ................................ 355/51 |
| 3,834,813 | 9/1974 | White ................................ 355/50 |
| 4,163,256 | 7/1979 | Adcock. |
| 4,273,440 | 6/1981 | Froessl. |
| 4,291,973 | 9/1981 | Brooke. |
| 4,310,239 | 1/1982 | Krzyminski. |
| 4,518,251 | 5/1985 | Larsson. |
| 4,537,500 | 8/1985 | Nemesnyik. |
| 4,571,636 | 2/1986 | Itoh. |
| 4,580,167 | 4/1986 | Diete. |
| 4,591,918 | 5/1986 | Hisano. |
| 4,660,102 | 4/1987 | Kawakami et al. |
| 4,691,253 | 9/1987 | Silver. |
| 4,701,809 | 10/1987 | Barrett. |
| 4,788,576 | 11/1988 | Saito et al. |
| 4,788,600 | 11/1988 | Marsiglio et al. |
| 4,873,579 | 10/1989 | Kubota et al. |
| 4,879,604 | 11/1989 | Koshiyouji. |
| 4,893,196 | 1/1990 | Koshiyouji et al. |
| 4,926,213 | 5/1990 | Komatsubara et al. |
| 4,959,737 | 9/1990 | Nakatani. |
| 5,038,227 | 8/1991 | Koshyouji et al. |
| 5,216,525 | 6/1993 | Lant. |
| 5,231,513 | 7/1993 | Yokobori et al. |
| 5,255,107 | 10/1993 | Copenhaver et al. |

OTHER PUBLICATIONS

*Reproduction Engineer*, May, 1958, "Small Photocopies Provide Security".
Photocopy of promotional literature relating to the neo-flow camera (Exhibit E).
Peerless Photo Products, Inc., Neo-Flow Camera, Operation Maintenance Manual.
*Product Engineering*, May 1953, "Mechanical Drives in the NEO-FLOW CAMERA".
*Automotive Industries*, reprint from Feb. 1, 1957, "Reducing Camera Lowers Cost of Engineering Drawings".
*American Machinist*, reprint from Jan. 30, 1956, "Save . . . labor cost, material cost, filing space, production time and avoid errors, when . . . Camera reduces shop paperwork".

*Primary Examiner*—Monroe H. Hayes
*Attorney, Agent, or Firm*—Hovey, Williams, Timmons & Collins

[57] ABSTRACT

A flow camera equipped with a microprocessor based control system accepts large original documents in continuous, moving fashion and photographs them through a specifically shaped slotted aperture positioned between the original document and an objective lens. The originals are illuminated during exposure simultaneously from the front and the back, recording congruent images from two-sided material such as engineering drawings on translucent media having positionally related information on both sides. The light from the underneath side, opposite the lens, not only reveals and exposes the image on the second side but it enhances the quality and sharpness of the primary image on the side toward the lens. Avoidance of image loss is accomplished by using in the optical system a single mirror which deflects the optical path substantially less than 90°. Servomotors with encoder feedback are correlated by the microprocessor to the degree of photographic reduction so that the ratio of speed between the original document and the moving strand of film is exactly equal to the reduction ratio to avoid speed induced distortion in the reduced and enhanced film image.

29 Claims, 10 Drawing Sheets

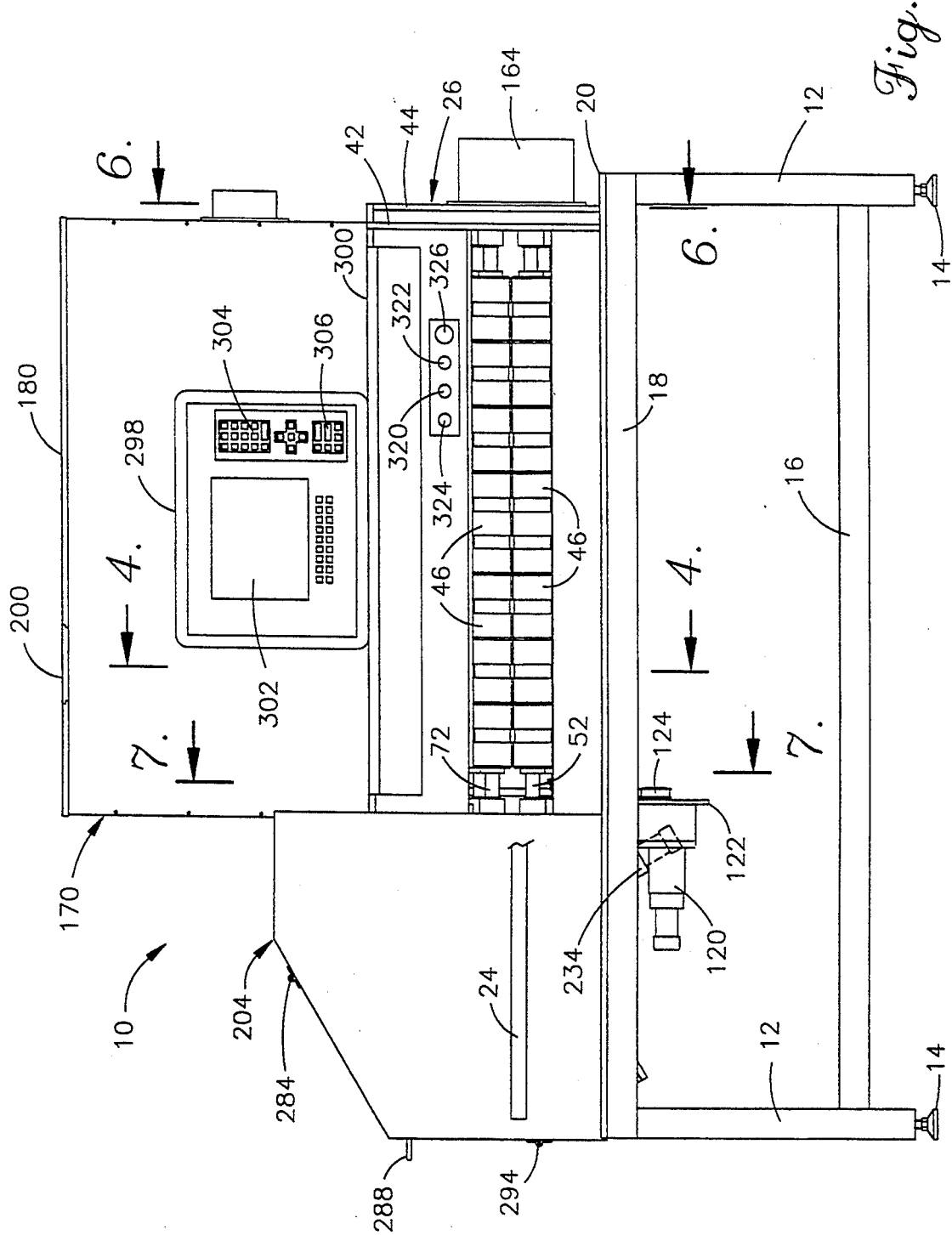

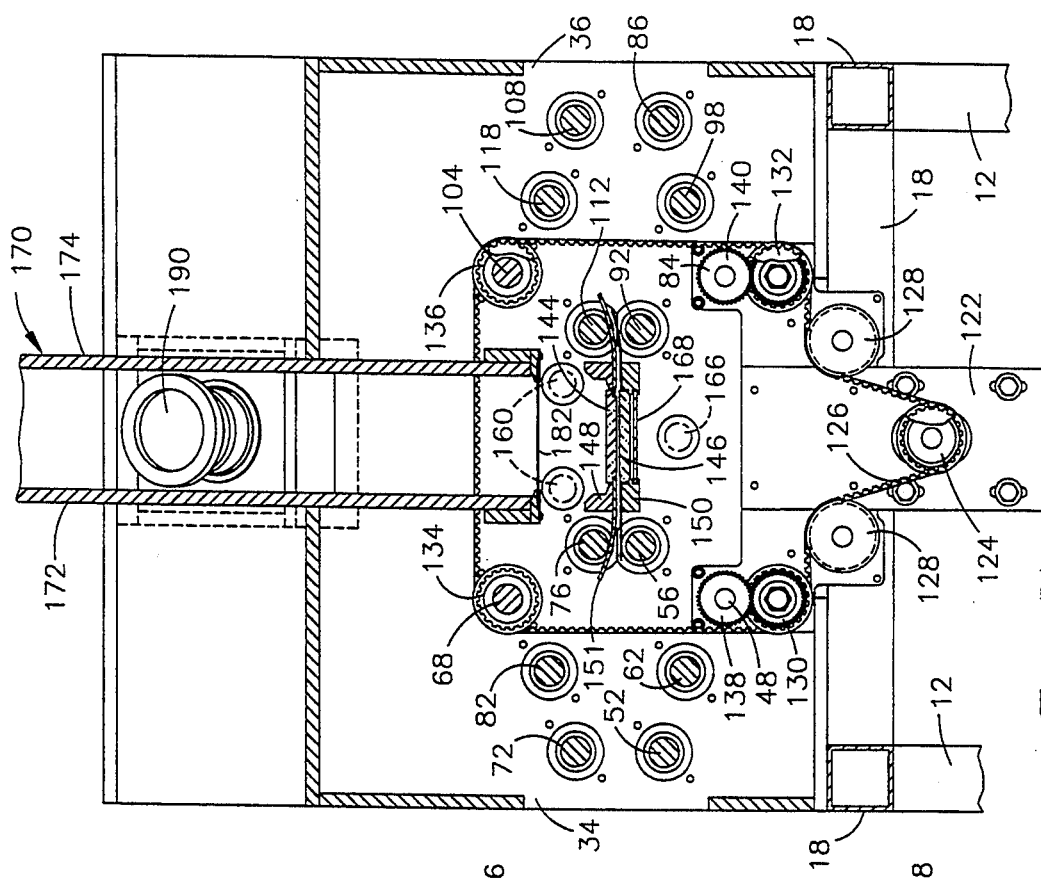
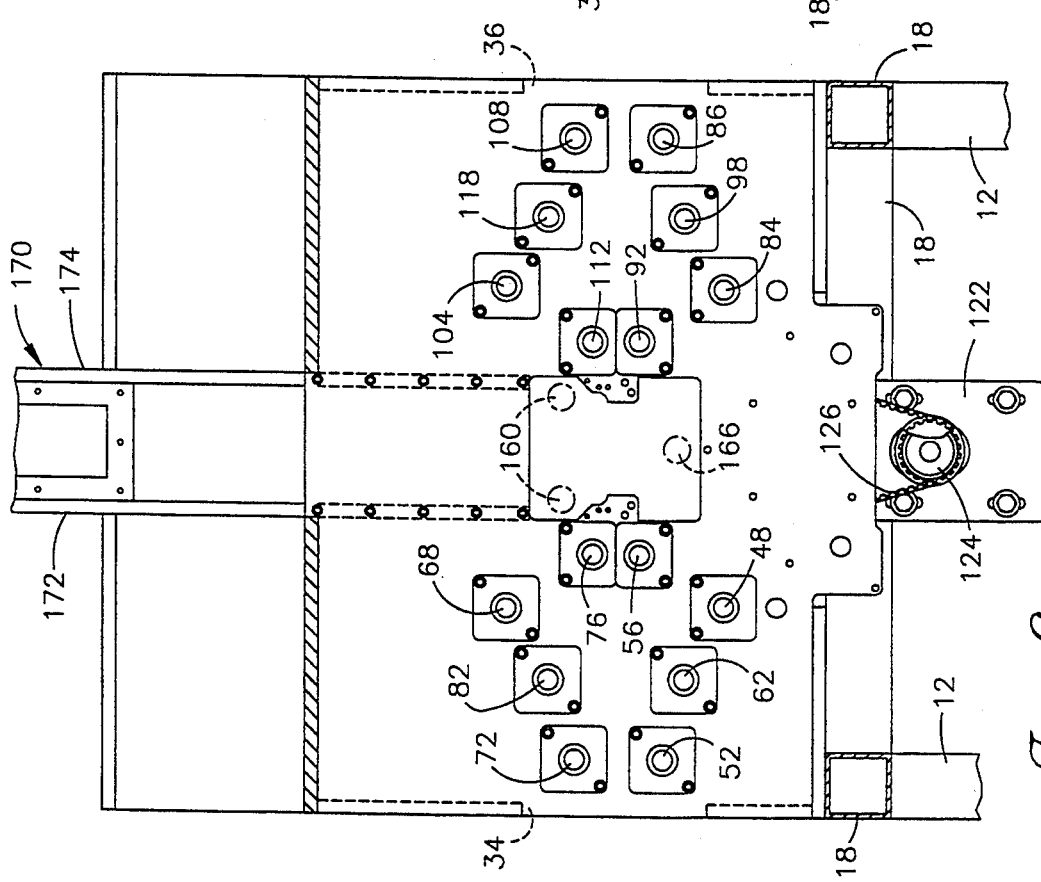

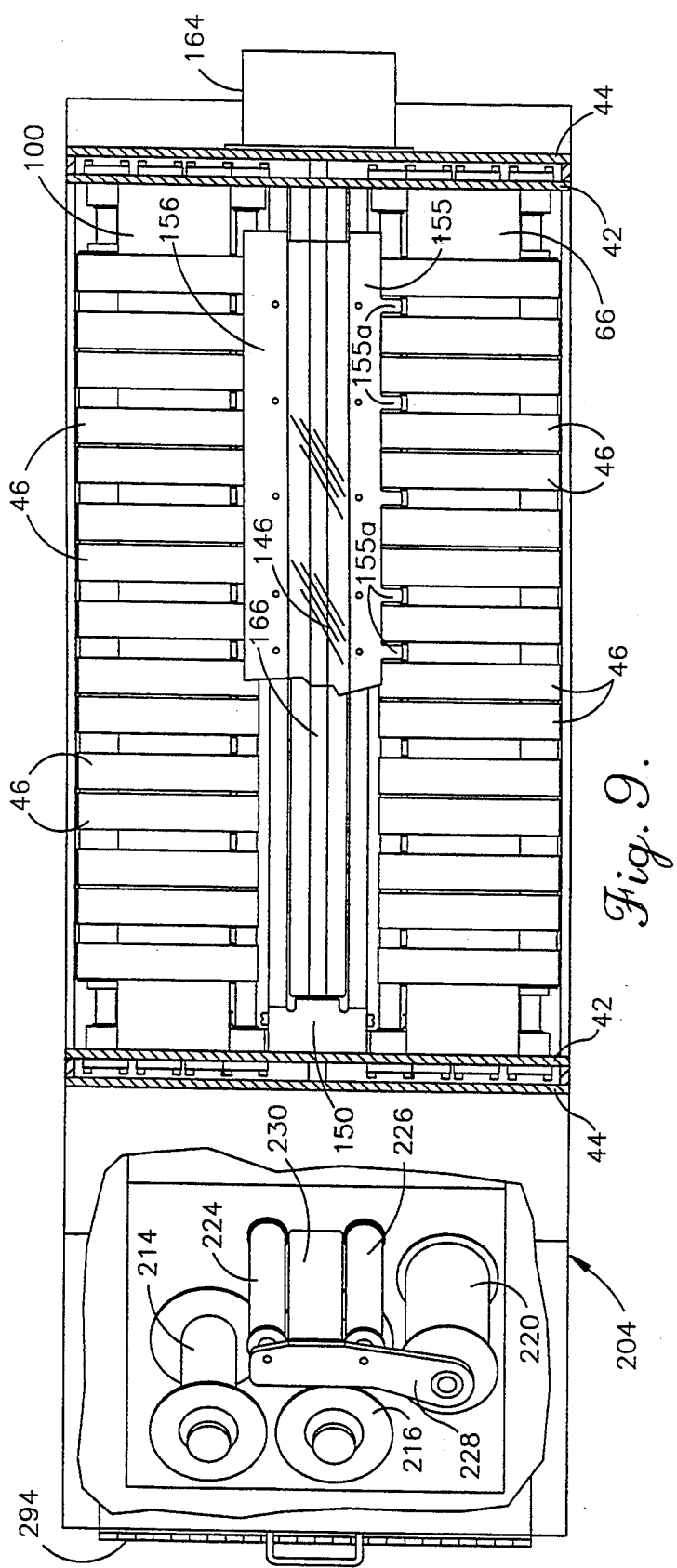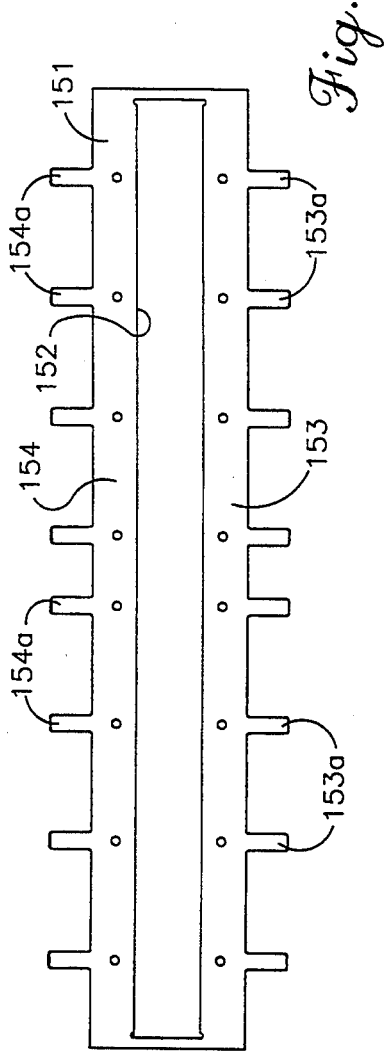

FLOW CAMERA FOR LARGE DOCUMENT REPRODUCTIONS

FIELD OF THE INVENTION

This invention relates generally to the field of photoreproduction and deals more particularly with a flow camera which reproduces large documents while the documents are in motion.

BACKGROUND OF THE INVENTION

In the photographic field, cameras which are generally referred to as flow cameras have been used principally to photographically reproduce large documents such as engineering drawings, maps and architectural plans. Normally, the reason for such reproductions is to reduce the size of the documents to make them more easily stored while retaining them in a form that allows their content to be recovered when needed. Industries such as aircraft and automotive manufacturing make use of large, roll length drawings and tracings, and the flow camera is desirable because it can reproduce this type of document in one piece on a roll of film.

The flow cameras that have been available in the past have suffered from a number of problems that have detracted from their widespread acceptance. Perhaps most notably, they have not been able to provide quality reproductions of documents that are of somewhat poor quality due to original poor quality or weak lines, age discoloration, dirt, seepage of adhesive from tape, or other reasons. In fact, the photographic process used by prior flow cameras frequently reduces the quality. Therefore, conventional flow cameras are not really useful for the large number of documents that are lacking in quality for any of a number of reasons.

Prior flow cameras provide lighting that is arranged to illuminate only the side of the original document that is located closest to the lens. This practice is not effective to reproduce material that may be on the opposite side of the document. For example, many engineering drawings use both sides of translucent media such as tracing paper or drafting mylar sheets. It is also common for architects to draw a building floor plan on one side of a drawing and piping or duct work on the other side. If only the front side of the sheet is illuminated, the material on the back is not picked up in the photoreproduction. Even if there is no copy on the back of the sheet, back lighting which is transmitted through the sheet at proper intensity can significantly sharpen lines on the front and thus enhance the image on the front in the photographic reproduction.

Because prior flow cameras for large documents have provided illumination on only one side, they have been able to use conveyor belts beneath the original copy. In contrast, if the copy is illuminated on both sides, belts and the like must be absent from the area where the copy is exposed, as belts would adversely affect the transmission of light even if they are transparent. Consequently, the concept of providing illumination on both sides of the original copy creates new problems with respect to designing a suitable conveyor system.

Devices commonly referred to as rotary microfilm cameras have been available for a number of years. Although the rotary camera lights the original copy on both sides, it does so in order to provide microfilm images of small, two sided documents such as checks. Rather than obtaining a single congruent image from the two sides of the document, the rotary camera obtains separate and independent images of the two sides which are typically stored side by side on the microfilm. The rotary camera does not have the capability of obtaining a congruent image of material on opposite sides of the same original document.

35 mm microfilm and aperture cards have also been used to store documents at a reduced size. However, the size reduction on microfilm is so severe that a significant reduction in quality occurs even if proper techniques and good equipment are used. Microfilm images are generally between 1/12 and 1/36 the size of the originals, and prints made from microfilm are poor in quality in all cases and unacceptable if the original is poor or even mediocre in quality.

In recent years, digital scanning processes have been developed which allow documents to be scanned and stored as retrievable digital data. Using digital techniques, central storage of all documents in one database is possible, and the data can be transmitted electronically and instantly over long distances. The scanning is carried out with solid state charge coupled devices (CCD) and employs up-to-date electronic technology and software. Despite the sophistication of scanning systems, they are inadequate if the original image quality is poor and also when parts of the image are on opposite sides of the sheet which is undergoing the scanning operation. Approximately 20% of original documents are not candidates for effective digital scanning because of their low quality.

Even though digital scanning processes are able to achieve enhancement of some of the images that are scanned, they do so at a considerable cost, both in terms of the time that is required and the involvement of technical personnel. While the scan time is usually less than a minute, it can take hours to raster edit and sample prior to the scan and to resample after the scan. At times, it is easier to have the document redrawn than it is to scan it with solid state sensors for image enhancement, and there is always a finite limit to the restoration that can be achieved digitally.

The complexity of digital image enhancement is due partly to the large number of functions that the enhancement should perform. These include thresholding, deskewing, edge sharpening, edge smoothing, image averaging, scaling, contrast enhancement, warping-/rubber sheeting, speckle removal, gap jumping, hole filling, and scaling.

Although some of these functions are handled automatically by software, others require interactive operator participation which can involve significant expenditures of time. For example, thresholding techniques require that the operator exercise judgmental skills to determine the threshold point and select either absolute or dynamic threshold modes. If dynamic thresholding is selected, the operator must decide which of the available contrast settings will return the best raster file data. In actual practice, operators typically prompt the scanner to cover a section of the document, retreat by backing up, and then advance again, all the while watching a monitor to determine what effect the thresholding is having on the image. This forward and backward movement can be repeated until the operator is satisfied that the optimum image is obtained from the thresholding.

The problems of digitally scanning poor quality originals have been recognized. High quality industrial cameras of the type disclosed in U.S. Pat. Nos. 3,639,054 and 3,762,816 to Wally et al. have been used to photograph poor quality originals in order to enhance their readability and restore the image quality with modest size reduction in a range of four to eight times. Full size reproductions can be made from the enhanced image on the film, and the reproductions can be enlarged with successful results because the camera enhancement in the negative makes a good quality reproduction possible.

Nevertheless, this technique is disadvantageous in that it is an expensive and time consuming task to first make a film negative (typically 8½×11 inches) and then blow it up to original size. Making the enlargement on a mylar drafting film is more expensive and time consuming than making the film negative. In addition, the problem of storing the enlargement aggravates an already difficult storage problem. Roll length drawings are even more troublesome because their length requires that they be photographed in pieces rather than continuously as a roll of film.

SUMMARY OF THE INVENTION

The present invention is directed to a flow camera which is specially constructed to make high quality, enhanced photoreproductions of large documents that can later be digitally scanned directly from the reduced size film negative or otherwise processed or stored for future use. It is a particular feature of the invention that the camera uses image enhancement techniques, effective lighting, high quality optics, and precise speed control of both the original copy and the film in order to produce a film negative that is reduced in size and yet enhanced in quality compared to the original. As a result, even if the quality of the original is poor, the image on the film negative is restored enough that it can be digitally scanned successfully without the need to make an enlarged reproduction or to use time consuming enhancement techniques in the scanning process.

Film images, being analog images, have many inherent advantages over digital, sensed images, particularly when the original is dirty, discolored or obliterated such as is common with old engineering drawings. A proper selection of film, usually orthochromatic, lithographic film, exposed behind a superb flat field lens with good lighting and developed in an appropriate developer such as rapid access solution in a processor, can achieve a degree of restoration far beyond that obtainable where digital sensors are used "from scratch".

After enhancement, the digitization can then be done from the film made in a camera much better than a scan can be made from the original reflection copy, partly because the negative image is lighted by transmission, not reflection. Transmission always sharpens the image. Reflection degrades the image.

The use of back lighting in combination with front lighting is an important feature of the invention. The back light assures that material on the back side of the sheet is photographed and also sharpens the image on the front side of the sheet. At the same time, the intensities of the front and back lights are independently adjustable so that the ratio of front to back light intensity can be balanced to accommodate the needs of the original document. A uniquely shaped slit has a special configuration to counteract lens perimeter loss and also to counteract the greater intensity of the lights near the center than near the ends.

The flow camera of the present invention is characterized by a special conveyor system that is devoid of conveyor belts in the area where the original copy is photographed. Nevertheless, the conveyor system maintains the copy in a precisely located plane to avoid distortions. Entry conveyor belts deliver the sheet between separator plates which feed it between a pair of transparent plates that hold the sheet in the proper plane as it is being photographed. The sheet then advances between discharge separator plates which direct it to discharge conveyor belts for pulling the sheet out of the camera and onto a discharge tray. Because the conveyor belts are absent from the area where exposure of the copy takes place, light from both the front and back lights can be transmitted without interference or other adverse effects from parts of the conveyor system or other hardware.

The flow camera is also equipped with a unique film transport system which advances the film at a speed precisely correlated with the speed of the sheet of original copy. The film is also held in a flat condition in the proper plane for exposure. A constant and accurately controlled relative speed between film and original is assured by using a capstan roller driven by a computer controlled servo motor to advance the film at a constant speed. The take up spool for receiving the exposed film is equipped with a slip clutch that accommodates variations in the take up spool diameter while allowing the film to advance at a constant linear speed around the capstan roller.

Through use of the flow camera of the present invention, a number of benefits are available compared to prior flow cameras, microfilm reduction and other comparable approaches that have been taken in the past. Among the advantages of the present invention are: (1) the camera generates a film negative which is a "first generation" copy that is more faithful to detail in the image than second or later generation copies; (2) the reduction is in the range of $\frac{1}{4}$ to $\frac{1}{8}$ the original size, and reductions of this severity do not unduly tax a decent optical system such that the reduction is faithful to detail and reasonably economical compared to microfilm which reduces much more drastically and thus loses detail, introduces distortion and is out of scale; (3) the negative working film used in the camera is much more sensitive to subtle detail than positive working film; (4) the negative working film used in the camera has a wide exposure latitude and is forgiving of imperfect exposure conditions; and (5) the massiveness of the camera makes proper alignment and geometry attainable so that a film image made at a reduction of $\frac{1}{4} - \frac{1}{8}$ can be made accurately and without distortions, unlike the situation with microfilm where even a minute piece of lint can degrade the effectiveness of a microfilm image.

DESCRIPTION OF THE DRAWINGS

In the accompanying drawings which form a part of the specification and are to be read in conjunction therewith and in which like reference numerals are used to indicate like parts in the various views:

FIG. 1 is a front elevational view of a flow camera constructed according to a preferred embodiment of the present invention, with portions broken away for purposes of illustration;

FIG. 6 is a fragmentary sectional view on an enlarged scale taken generally along line 6—6 of FIG. 1 in the direction of the arrows;

FIG. 7 is a fragmentary sectional view on an enlarged scale taken generally along line 7—7 of FIG. 1 in the direction of the arrows;

FIG. 9 is a fragmentary sectional view taken generally along line 9—9 of FIG. 4 in the direction of the arrows, with portions broken away for purposes of illustration;

FIG. 12 is a top plan view of the upper separator plate of the flow camera;

DETAILED DESCRIPTION OF THE INVENTION

Figure 3:
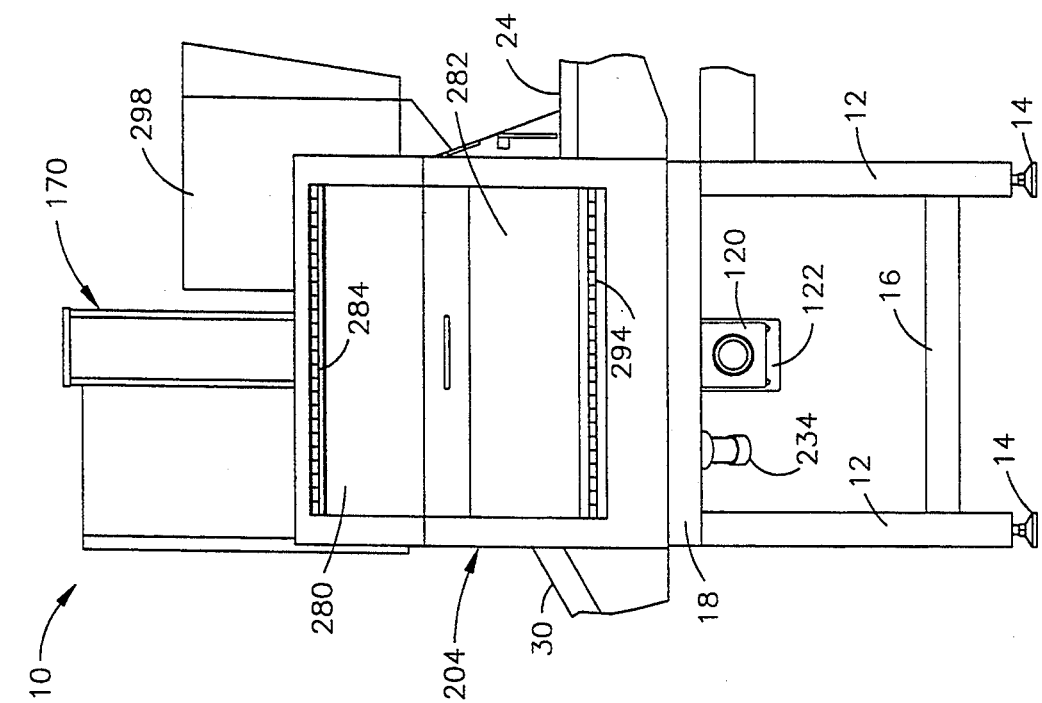
FIG. 3 is a left end elevational view of the flow camera, with portions broken away.
Figure 2:
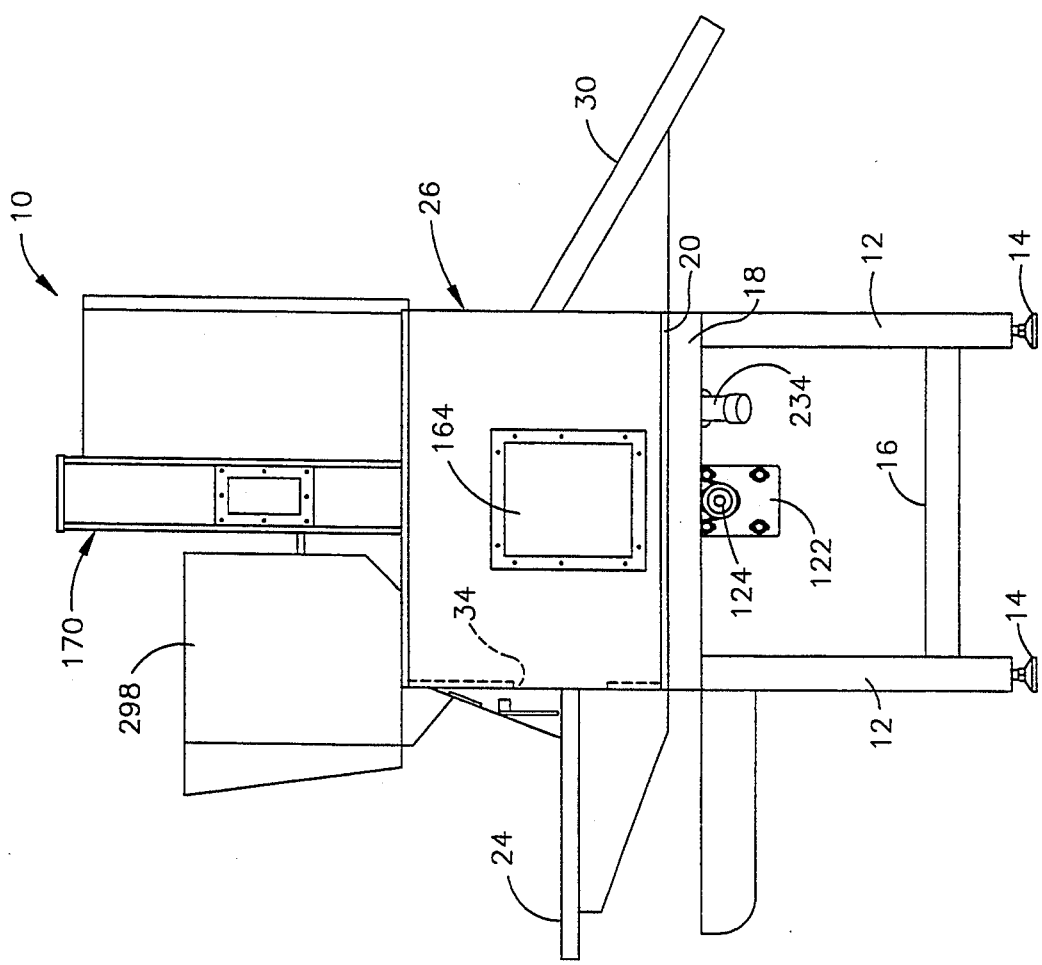
FIG. 2 is a right end elevational view of the flow camera shown in FIG. 1.

Referring now to the drawings in more detail and initially to FIGS. 1-3, numeral 10 generally designates a flow camera which is constructed in accordance with the present invention and which is useful in the photoreproduction of large documents such as engineering drawings or architectural plans. The camera 10 has a rigid frame which includes a plurality of legs 12 equipped with adjustable pads 14 on their lower ends. Horizontal braces 16 extend between the legs 12. At their top ends, the legs 12 are interconnected by additional horizontal braces 18. The legs 12 and braces 16 and 18 are preferably constructed of square metal tubing. A rigid metal plate 20 is supported on the upper braces 18 and provides a horizontal surface upon which the operating components of the camera are mounted.

Figure 4:
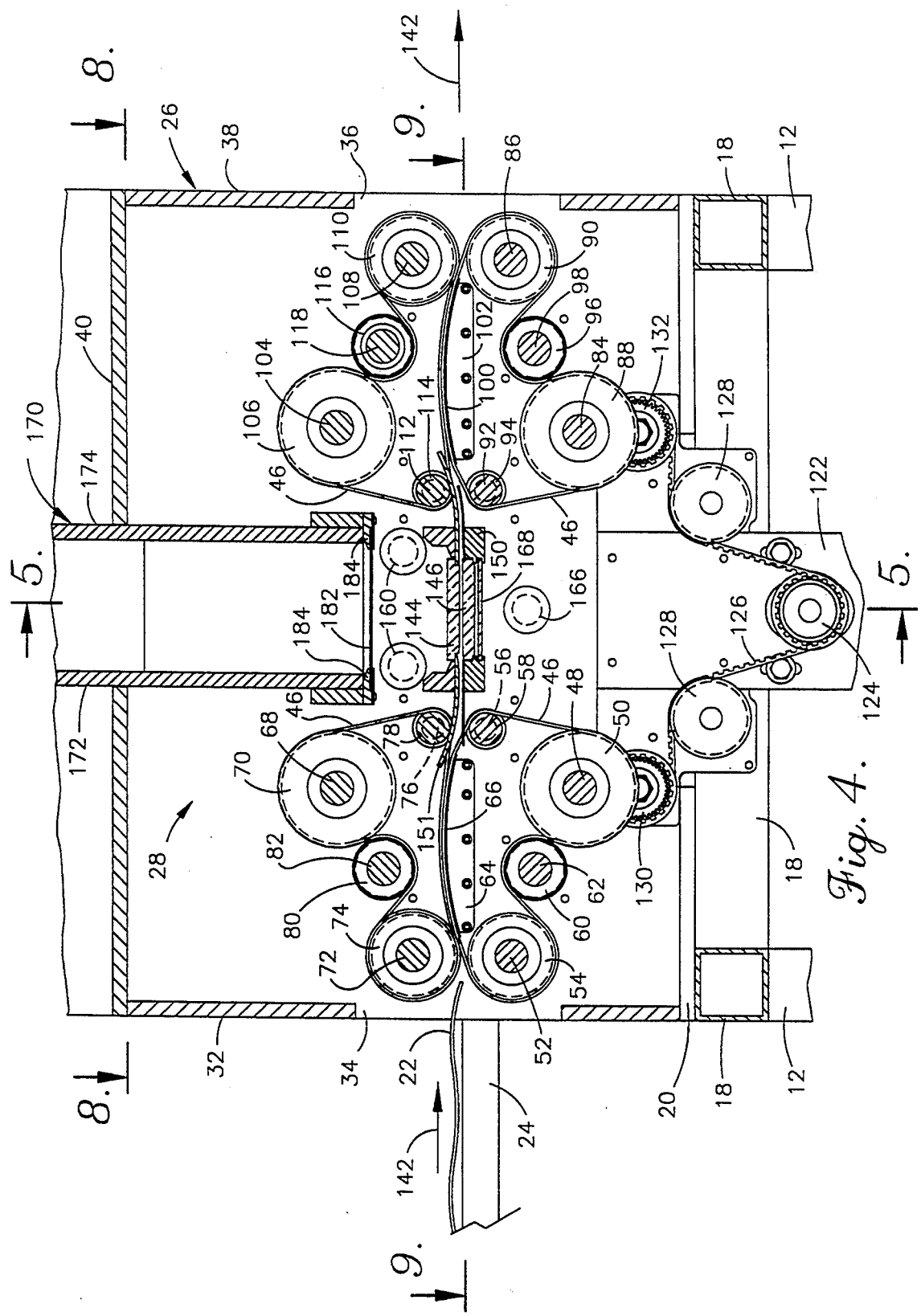
FIG. 4 is a fragmentary sectional view on an enlarged scale taken generally along line 4—4 of FIG. 1 in the direction of the arrows.
Figure 8:
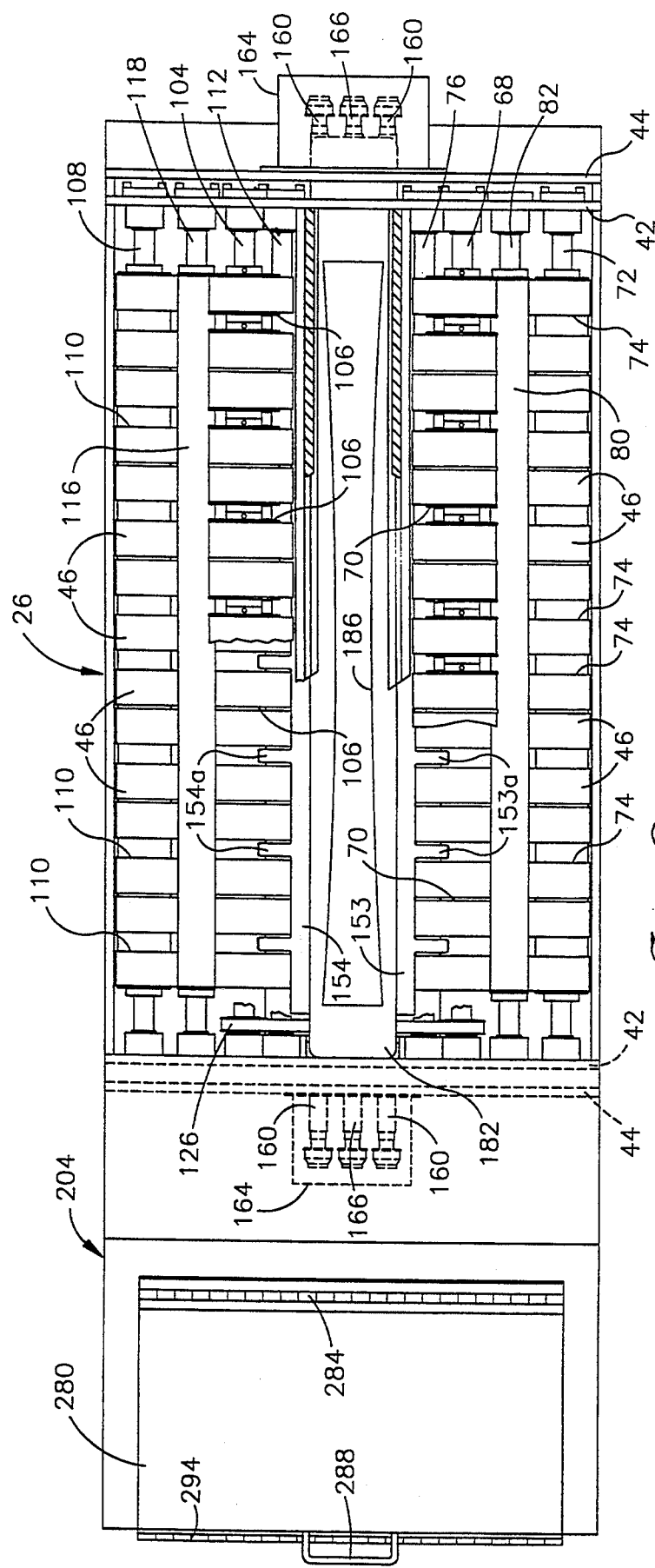
FIG. 8 is a fragmentary sectional view taken generally along line 8—8 of FIG. 4 in the direction of the arrows, with portions broken away for purposes of illustration.

The camera 10 operates to photograph large documents such as the long sheet 22 which is depicted fragmentarily in FIG. 4. The documents are fed into the camera by placing them on a horizontal feed leaf 24 (see FIG. 2) which is mounted on the front side of a conveyor cabinet 26 supported on plate 20. The conveyor cabinet 26 contains a conveyor system which is generally identified by numeral 28 in FIG. 4 and which conveys the sheets lengthwise through the conveyor cabinet and onto a tray 30 (FIG. 2) located on the back side of the cabinet. As shown in FIG. 4, the cabinet 26 has a front panel 32 presenting an inlet slot 34 through which the sheets enter cabinet 26. An outlet slot 36 is formed in a back panel 38 of the cabinet, and the sheets are conveyed out of the cabinet through slot 36 and onto the tray 30. Cabinet 26 has a top panel 40. As shown in FIGS. 8 and 9, each end of the housing 26 includes a pair of spaced apart end panels 42 and 44. The inside end panels 42 provide support for the operating components of the conveyor system 28, while the outside panels 44 form the exterior surfaces on the ends of the conveyor housing. All of the panels for the housing 26 are constructed of aluminum jig plates to provide the housing with a massive and strong construction capable of withstanding vibrational forces.

Referring to FIG. 4 in particular, the conveyor 28 for the sheet originals 22 includes an entry side located adjacent to the inlet slot 34 and a discharge side located downstream from the entry side adjacent to the outlet slot 36. Both the entry and discharge sides of the conveyor include upper and lower sections each having a plurality of spaced apart belts 46 drawn around a plurality of pulleys.

With reference particularly to FIG. 4 and referring first to the lower section of the input side of the conveyor system 28, a horizontal shaft 48 is mounted for rotation in extension between the inside end panels 42 of the cabinet. Secured on the shaft 48 are a plurality of spaced apart flanged pulleys 50, some of which are single pulleys and others of which are double pulleys carrying two belts 46. Another horizontal shaft 52 is similarly supported for rotation and carries a roller 54 located near the inlet slot 34. An idler shaft 56 is located above and slightly downstream from shaft 48 and carries a roller 58. The belts 46 on the lower section of the inlet side of the conveyor system are drawn around the pulley 50 and the rollers 54 and 58 and are looped around a tension roller 60 which is carried on a shaft 62 and serves to maintain the tension of the belts 46. A belt guide 64 is secured in the cabinet 26 and is provided with a curved top plate 66 which immediately underlies each of the belts 46 in the lower section of the entry side of the conveyor system. The plate 66 provides a guide surface for the upper run of each of the belts 46 in order to maintain the lower belts 46 closely adjacent to and in firm contact with the upper belts 46.

The upper section of the entry side conveyor is constructed in a manner similar to the lower side, but in a generally mirror image configuration. As shown in FIGS. 4 and 8, a driven shaft 68 carriers a plurality of large flanged pulleys 70 located directly above pulleys 50. Another shaft 72 located near the slot 34 carries a roller 74 located above roller 54. An idler shaft 76 carries an idler roller 78, and a tension control roller 80 is carried on another shaft 82. The belts 46 are drawn around pulley 70 and rollers 74 and 78 and are looped around the tension control roller 80. The lower run of each upper belt 46 closely confronts the upper run of the corresponding lower belt, with the confronting portions of the belts in the upper and lower conveyor sections moving in the same direction to convey the sheets 22 between them.

The discharge side of the conveyor system is substantially a mirror image of the entry side. The lower section includes a driven shaft 84 and an idler shaft 86. Shaft 84 carries a plurality of flanged pulleys 88, while shaft 86 carries a roller 90. An idler shaft 92 carries a roller 94, and a tension control roller 96 is carried on a shaft 98. The belts 46 are drawn around pulley 88 and rollers 90 and 94, are looped around the tension control roller 96, and travel on top of a curved surface 100 provided on a belt guide plate 102.

The upper section of the discharge side of the conveyor includes a shaft 104 carrying relatively large pulleys 106, a shaft 108 carrying a roller 110, and an idler shaft 112 carrying a small roller 114. Tension control is provided by a roller 116 carried on a shaft 118. The belts 46 which are included in the upper discharge section of the conveyor system are drawn around pulley 106 and rollers 110, 114 and 116, such that the lower runs of these belts move adjacent to and in the same direction as the upper runs of the lower belts.

FIG. 7 best illustrates a drive system which drives the conveyor system 28. An electric servo motor 120 (FIG. 1) is mounted beneath plate 20 on a bracket plate 122. As shown in FIG. 7, the motor 120 drives a timing belt pulley 124 on its shaft. A timing belt 126 which is toothed on one side is drawn around and driven by the timing belt pulley 124. The smoother back side of the belt 126 is drawn around a pair of pulleys 128, and the toothed face of the belt is drawn around and drives a pair of lower timing belt pulleys 130 and 132 and a pair of upper timing belt pulleys 134 and 136 located directly above the respective lower pulleys 130 and 132. Pulley 134 is mounted on shaft 68 in order to drive it and the roller 70 it carries (FIG. 4). Similarly, pulley 136 is mounted on shaft 104 to drive it and pulleys 106. Pulley 130 is affixed to a spur gear that meshes with and drives another spur gear 138. Gear 138 is mounted on shaft 48, thereby driving shaft 48 and the pulleys 50 in a direction opposite the direction of rotation of pulleys 70. The other lower timing belt pulley 132 is similarly affixed to a spur gear that meshes with and drives a spur gear 140 mounted on shaft 84. Shaft 84 and the pulleys 88 it carries are thus driven in a direction opposite the direction of rotation of pulleys 106.

By this drive arrangement, the belts 46 in the upper and lower conveyor sections on both the entry and discharge sides are held adjacent to one another, and the adjacent portions of the belts 46 are driven in the same direction (left to right as viewed in FIG. 4). The directions in which the belts are driven are such that the documents which are fed into slot 34 are gripped between the confronting parts of the belts 46 on the entry side of the conveyor system and are conveyed by these belts rearwardly toward the discharge side of the conveyor system. The belts on the discharge side of the system receive the sheets and convey them to the rear and out through the discharge slot 36. The sheets are thus conveyed from front to back through the cabinet 26 at a constant speed and in the direction indicated by the directional arrows 142 in FIG. 4.

Figure 13:
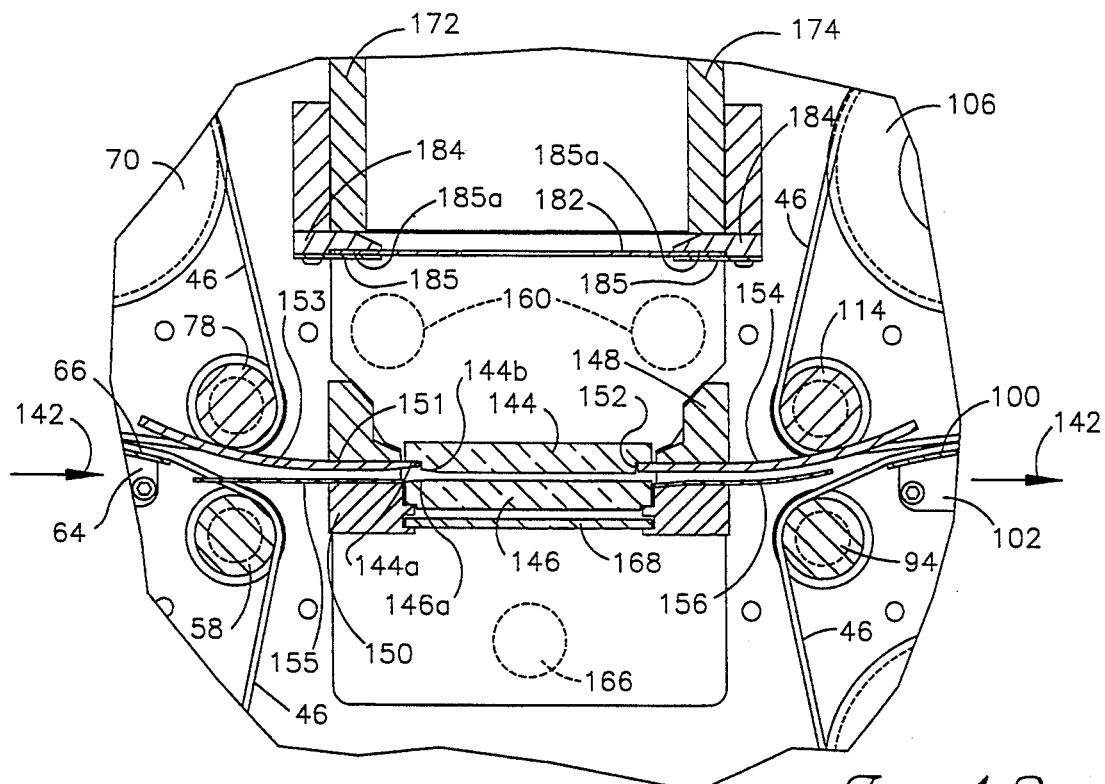
FIG. 13 is a fragmentary sectional view similar to FIG. 4 but on a larger scale.

The images on the sheets 22 are photographed as the sheet passes closely between a pair of elongated glass panels 144 and 146 which are spaced apart one above the other at a location between the entry and discharge sides of the conveyor system 28. As best shown in FIG. 13, an upper bracket 148 extends between the inside end panels 42 of the cabinet. A lower bracket 150 is secured between end panels 42 at a location below the upper bracket 148. A top separator plate 151 is secured to the underside of bracket 148 by suitable fasteners. The configuration of the top separator plate 151 is best shown in FIG. 12. The plate 151 has an elongated cutout 152 in which the upper glass panel 144 is located. Plate 151 has one side edge portion 153 which projects toward the front or entry side of the camera and another, similar side edge portion 154 which projects toward the back or discharge side of the camera. As best shown in FIG. 13, portion 153 curves upwardly as it extends toward the entry slot. Portions 154 similarly curves upwardly toward the discharge slot. Spaced apart fingers 153a extend from the edge of portion 153 and are received between the belts 46 of the top section of the entry side of the conveyor system 28. Similar fingers 154a extend from the edge of portion 154 and are received between the belts 46 of the top section of the discharge side of the conveyor system.

Referring additionally to FIG. 13, the upper glass panel 144 is provided with shoulders 144a which seat on top of the top separator plate 151 to support panel 144 at a location occupying the cut out 152. The underside of panel 144 is provided with a chamfer 144b (or with a radius) along the edge closest to the entry side of the camera. The chamfer 144b is located and shaped to provide a gradual entry for the documents into the space between the glass panels 144 and 146.

The lower bracket 150 supports a pair of lower separator plates 155 and 156 which are spaced below the respective portions 153 and 154 of the upper separator plate 151. Plate 155 is secured on top of bracket 150 and extends toward the front or entry side of the camera. As shown in FIG. 9, spaced apart fingers 155a extend from the edge of plate 155 between the belts 46 on the lower section of the entry side of the conveyor 26. The other plate 156 is secured on top of bracket 150 and extends toward the discharge side of the camera. Plate 156 has no fingers.

The lower glass panel 146 is provided on its edges with shoulders which sit on ledges that project inwardly from the lower bracket 150. This positions panel 146 a selected distance below panel 144. The top surface of panel 146 is provided with a chamfer 146a on the edge closest to the entry slot. The space between the plates 153 and 155 is positioned to receive the sheets as they emerge from the entry conveyor belts 46. The upwardly curved shape of the top separator plate portion 153 provides a configuration in which the space between the plates 153 and 155 diverges toward the entry belts 46, thus facilitating entry of the documents into the space between the separator plates. The space between the separator plates converges toward the glass panels 144 and 146 and adjacent to the glass panels is substantially the same size as the space between the panels. Consequently, the separator plates cooperate in guiding the sheets into the space between the glass panels where the document is photographed. The chamfers 144b and 146a also facilitate entry of the documents into the exposure area between the glass panels. The fingers 153a and 155a facilitate entry of the documents into the space between the separator plates and thereby prevent jamming of the conveyor system.

The arrangement and configuration of the separator plates and glass panels presents a space between the glass panels that is approximately the same size as the space between the separator plates at a location adjacent to the glass panels, thus assuring that the documents can pass smoothly into the space between the separator plates 153 and 155, then through the space between the glass panels 144 and 146 and into the space between the separator plates 156 and 158.

Figure 5:
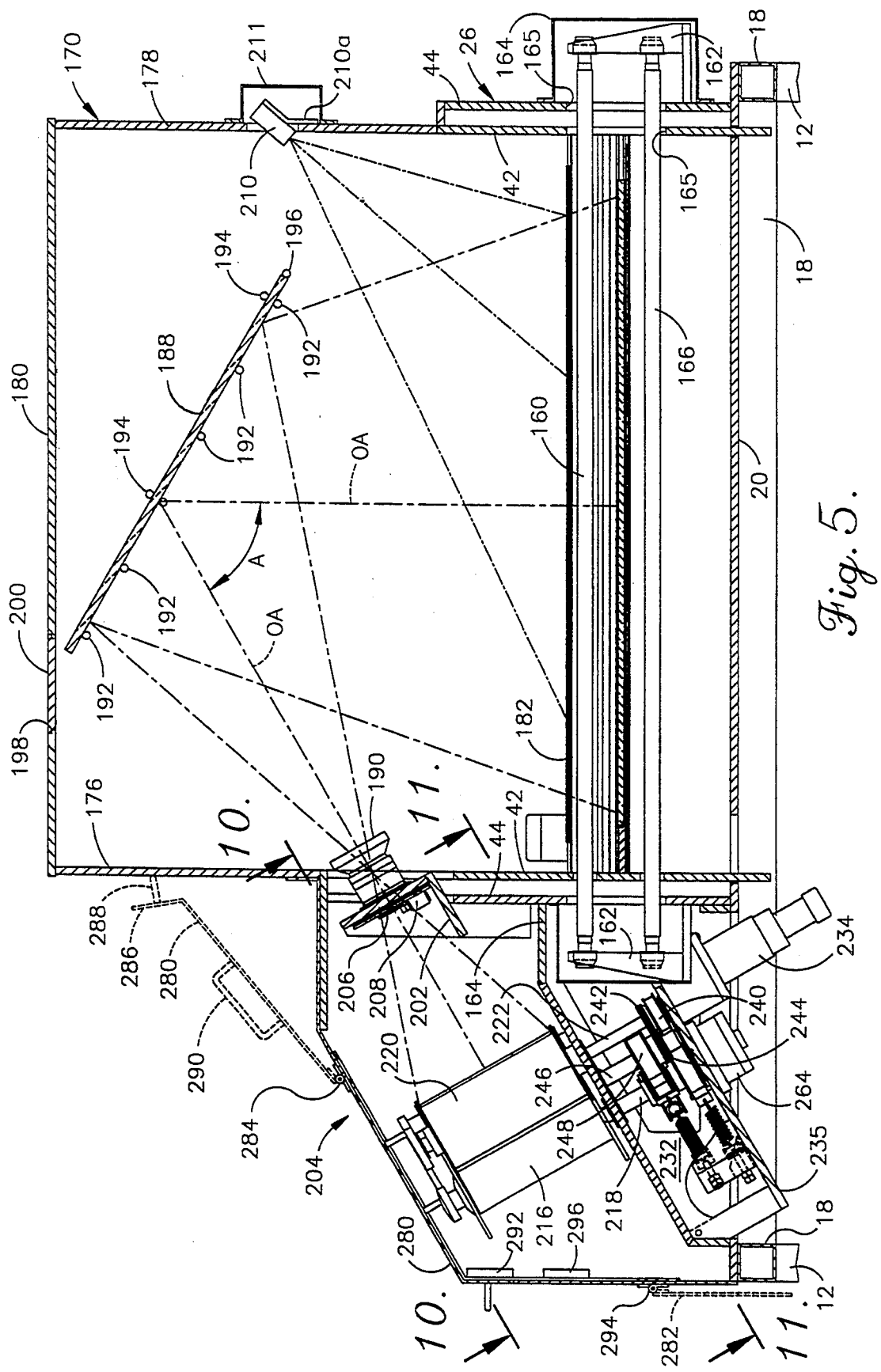
FIG. 5 is a fragmentary sectional view taken generally along line 5—5 of FIG. 4 in the direction of the arrows.

The flow camera 10 includes both front lighting and back lighting for illuminating both surfaces of the documents which are being photographed. The front lighting system includes a pair of linear fluorescent lamp tubes 160 which are mounted in the conveyor cabinet 26 at locations spaced above the opposite side edges of the top glass plate 144. The tubes 160 are located equidistantly from the longitudinal center line of plate 144. As best shown in FIG. 5, sockets for receiving the opposite ends of the tubes 160 are provided by brackets 162 which are enclosed in removable light shield boxes 164 secured on the outside end panels 44 of the cabinet 26. The left ends of tubes 60 as viewed in FIG. 5 enter the box 164 through aligned openings 165 formed through the panels 42 and 44. The tubes 160 serve as linear light sources which are located above the document that is being photographed and thus provide front lighting which reflects off of the front or upper face of each document for illumination thereof.

With continued reference to FIGS. 4 and 5, the back lighting is provided by a single elongated fluorescent lamp tube 166 which is located immediately below the longitudinal center line of the lower glass plate 146. The opposite ends of tube 166 are received in sockets formed on the brackets 162. A flat diffuser panel 168 which may be constructed of plexiglass or another suitable material is supported in grooves formed in the lower bracket 150 and is thus located between tube 166 and the lower glass plate 146. The tube 166 is located below the document and thus projects light through the document from bottom to top. As will be explained more fully, the light which emanates from the back light 166 allows material on the back or bottom side of each document to be photographed and also sharpens the detail on the front or upper face of each document by projecting light upwardly through the document.

Overlying the glass plates 144 and 146 and extending upwardly out of the cabinet 26 is an optical tower which is generally identified by numeral 170. As best shown in FIG. 7, the optical tower 170 includes parallel front and back panels 172 and 174 which are suitably secured to the cabinet 26. With reference to FIG. 5, above the cabinet 26, end panels 176 and 178 extend upwardly above the cabinet panels 42 to enclose the opposite ends of the tower 170. A flat top panel 180 encloses the top of the tower. The panels of which the tower 170 is constructed are of aluminum jig plates to provide the tower with sufficient mass and rigidity to resist vibrational forces.

Figure 14:
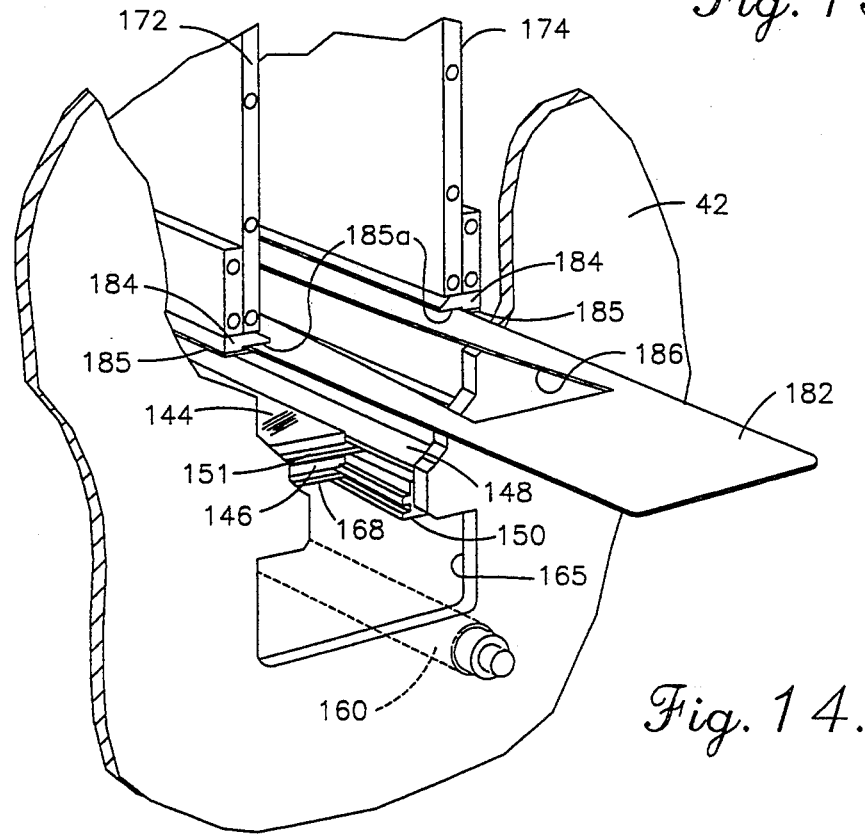
FIG. 14 is a fragmentary perspective view showing how the mask plate and light tubes are removable from the flow camera.
Figure 15:
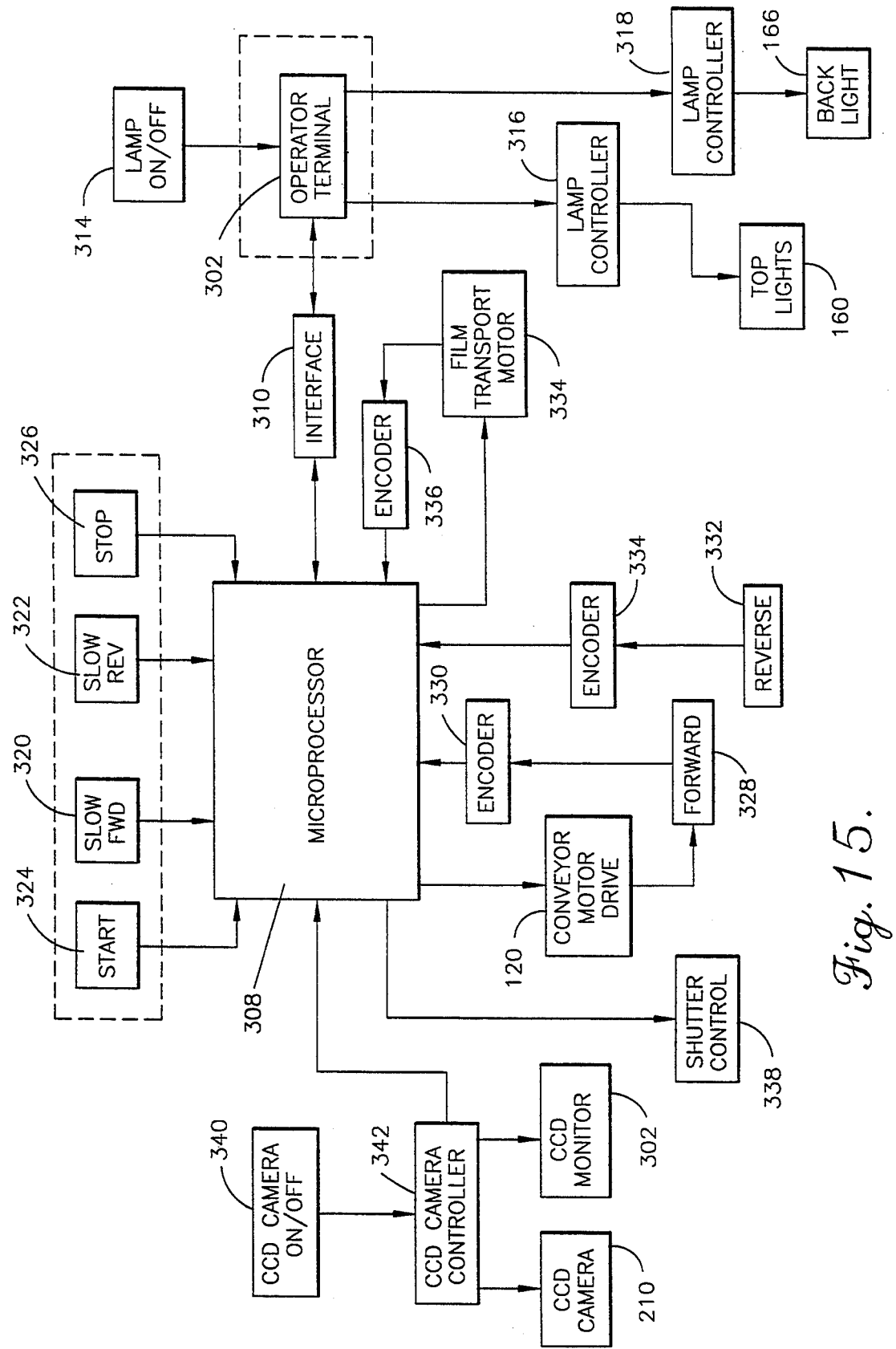
FIG. 15 is a block diagram of the control system for the flow camera.

As best shown in FIGS. 13 and 14, a thin mask 182 is secured to the bottom of the optical tower 170 and can be removed and replaced with a different mask if necessary. Brackets 184 are suitably secured to the lower edges of the tower panels 172 and 174. Thin strips 185 are fastened to the bottoms of the brackets 184 to provide thin grooves 185a in which the side edges of the mask 182 are received to hold the mask in place.

FIG. 14 depicts the manner in which the light tubes 160 and 166 and the mask 182 may be removed and replaced. When the light shield box 164 is removed, access to the tubes 160 and 166 is provided, and the tubes can be taken out of the camera and replaced with new light tubes. Likewise, the mask 182 can be slid out of the grooves 185a and out of the camera through the opening 165. A different mask can then be slid into place in the grooves 185a before the box 164 is replaced.

The mask 182 is provided with an elongated slit 186 having a special configuration that is best shown in FIG. 8. The long edges of the slit gradually curve outwardly or away from one another as they extend from the center of the slit toward its opposite ends. This provides the slit with a slight hour glass shape having a greater width at the ends than at the center. The center of the slit 186 is located on the optical axis of the camera, and the slit progressively increases in width away from the optical axis to the left and right. The optical tower 170 is light tight and allows light to enter only from below through the slit 186.

With particular reference to FIG. 5, the light which enters the tower 170 is reflected by a first surface mirror 188 toward an objective lens 190. The mirror 188 is held securely in place within the tower 170 in an inclined guideway defined between a straight row of lower Delrin pins 192 and a pair of upper Delrin pins 194. The pins 192 and 194 protrude inwardly through holes in the front and back plates 172 and 174 of tower 170 and support the edge portions of the mirror 190. The lower edge of the mirror 192 rests against a pair of pins 196 also protruding through the tower panels 172 and 174. The pins 192 and 194 thus define a guideway for the mirror which is closed at the bottom by the pins 196 and open at the top so that the mirror can be slid into and out of the guideway. The holes for these pins may be very precisely drilled. The mirror 188 is oriented such that light which is directed along the optical axis OA of the optical system reflects from the mirror at an angle A (FIG. 5) which is less than 90°.

The top panel 180 of the tower is provided with an access opening 198 adjacent to the upper edge of the mirror 188. The opening 198 is normally closed in a light tight fashion by a cover 200. The cover 200 is removable to provide access to the mirror 188 so that it can be removed from the guideway and from the optical tower 170 for cleaning, inspection, replacement or other purposes. When the camera is in use, the cover 200 is in place to close the opening 198.

With continued reference to FIG. 5 in particular, the lens 190 is mounted adjacent to one end of the optical tower 170 on a bracket plate 202. The lens 190 is centered on the optical axis OA of the camera in a passage which connects the optical tower 170 with a film compartment generally designated by numeral 204. The lens 190 focuses light on light sensitive film 205 (FIG. 10) within the film compartment 204. The lens is equipped with a shutter 206 controlled by a small actuator 208. A small CCD camera 210 may be located in the optical tower near the lens 190 to permit operator monitoring of the documents, as will be explained more fully. The CCD camera 210 is mounted to a bracket 210a and is accessible when a box 211 is removed from the tower 170.

Figure 10:
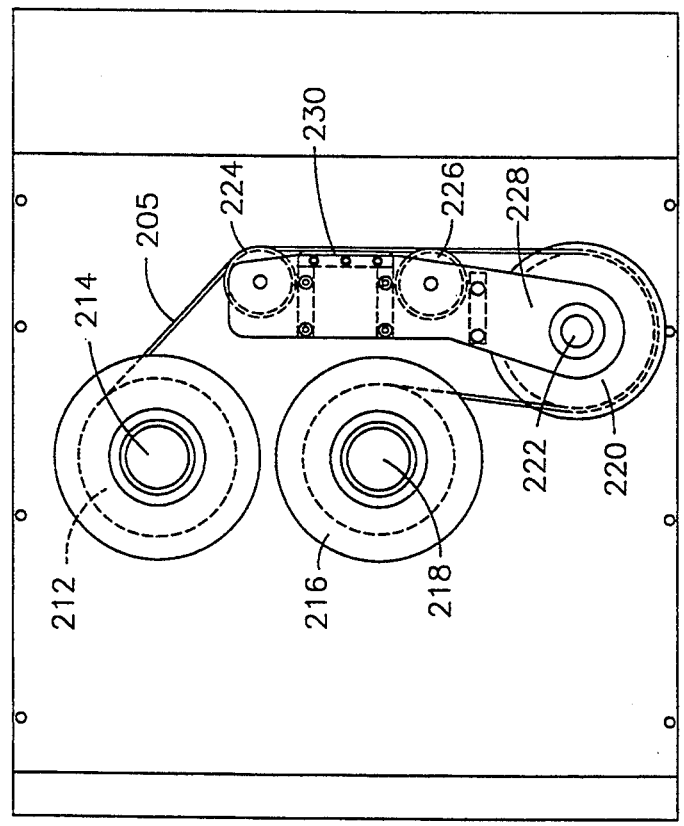
FIG. 10 is a fragmentary sectional view taken generally along line 10—10 of FIG. 5 in the direction of the arrows.

The film compartment 204 is light tight and is located adjacent to one end of the cabinet 26 and optical tower 170. As best shown in FIG. 10, the film 205 is supplied in a roll 212 secured on a spindle 214 having flanges on its top and bottom ends to hold the roll 212 on the spindle. The exposed film 205 is wound onto a take up spool 216 having a shaft 218. A capstan roller or drum 220 is mounted in the film compartment on a driven shaft 222 which is parallel to the shafts 214 and 218. A pair of idler rollers 224 and 226 are supported for rotation within the film compartment at locations generally between the spindle 214 and the capstan roller 220. A bracket arm 228 extends from the capstan shaft 222 to the idler rollers 224 and 226. Between the idler rollers, the bracket 228 carries a flat plate 230 which is situated at an exposure station where the film 205 is exposed. The face of plate 230 occupies a plane that is tangent to both of the idler rollers 224 and 226. The film 205 is drawn from the roll 212 around the first idler roller 224, along the flat guide surface 230 to the other idler roller 226 and then around the capstan roller 220 to the take up spool 216. The capstan shaft 222 and the take up spool shaft 218 are both driven shafts which pull the film 205 off of the roll 212 for exposure and wind it onto the take-up spool 216 after it has been exposed. The capstan roller 220 has a rubber or other high friction surface to avoid film slippage and assure that the film is reliably advanced at a constant speed.

The camera 10 is equipped with a film drive system which advances the film 205 at a speed that is precisely controlled and correlated to the speed at which the document that is being photographed is advanced by the conveying system 28. As best shown in FIG. 5, an enclosed compartment identified by numeral 232 is located generally beneath the film compartment 204 and contains components of the film drive system. An electric servo motor 234 is mounted to an inclined panel 235 which forms the bottom of the compartment 232. With additional reference to FIG. 11, the output shaft of the motor 234 carries a timing belt pulley 236 located within compartment 232. A toothed timing belt 238 is drawn around pulley 236 and another timing belt pulley 240 which is carried on the capstan drive shaft 222. Through the pulleys 236 and 240 and the belt 238, the motor 234 drives the capstan shaft 222 at a constant speed in order to pull the film 205 from roll 212 at a linearly constant speed. The lens 190 focuses the light from the copy onto the portion of the film which is located between the idler rollers 224 and 226. This portion of the film is held under tension and maintained in a flat plane by the idler rollers and the guide plate 230, and the plane is oriented perpendicular to the optical axis OA to assure focus on the film.

With reference again to FIG. 11 in particular, shaft 222 carries a spur gear 242 affixed to pulley 240. Gear 242 meshes with and drives another gear 244 mounted on a shaft 246. Also mounted on shaft 246 is a pulley 248. The take up spool shaft 218 extends into compartment 232 and carries a pulley 250. A drive belt 251 is drawn tightly around the pulleys 248 and 250 and also around another pulley 252 which forms part of a device commonly known as a Prony brake that serves to control the tension of the drive belt 250. The pulley 252 is carried on a bracket 254 which is hooked to one end of the tension spring 256. The opposite end of the spring 256 is hooked to a pin 258 which is carried on a threaded rod 260. The rod 260 is threaded through a bracket plate 262 and secured by nuts 263. The plate 262 is secured to panel 232. The force exerted by the tension spring 256 pulls pulley 252 in a direction to maintain the drive belt 251 under tension. However, the Prony brake mechanism also accommodates slippage of belt 251 to compensate for variations in the diameter of the film roll wound on the take-up spool 216. The location of the pin 258 can be adjusted in order to vary the tension on the belt 251.

An electric brake 264 (FIG. 5) is connected with shaft 214 to stop the shaft immediately upon deenergization of the film drive motor 234. The brake 264 may be a type that is commercially available and known as a Warner electric brake. It operates electrically to brake shaft 214 when the motor 234 stops, thereby preventing the film from unwinding from spindle 214.

Figure 11:
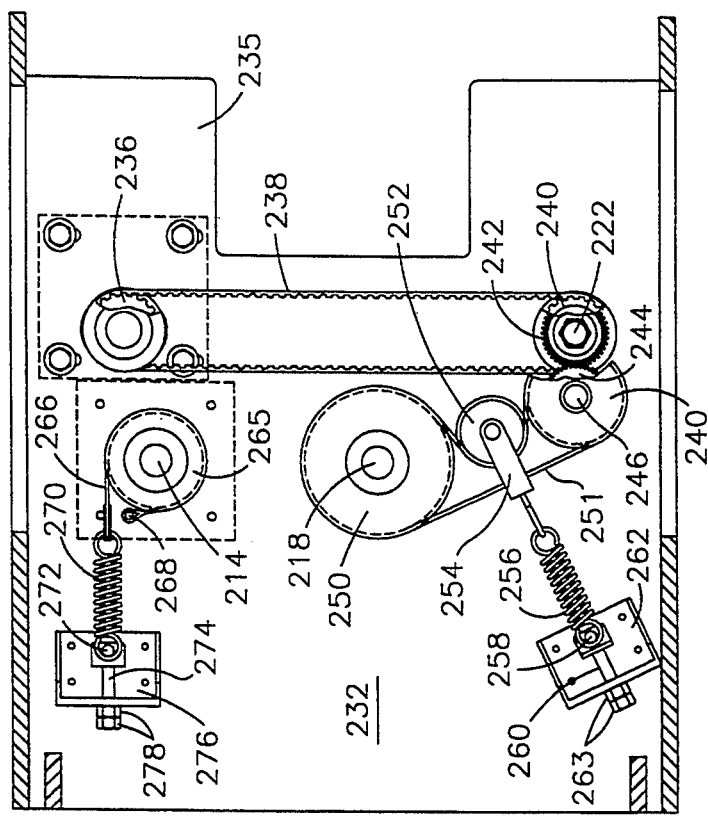
FIG. 11 is a fragmentary sectional view taken generally along line 11—11 of FIG. 5 in the direction of the arrows.

Another Prony brake applies a drag force to spindle 214 so that the film remains flat while it is being exposed and so that it is maintained under tension to advance at a uniform speed. With reference to FIG. 11, the spindle 214 is provided with a pulley 265 within the compartment 232. The strap 266 is fixed at one end to a pin 268 and is drawn around the pulley 265. The opposite end of the strap 266 is hooked to one end of a tension spring 270. The opposite end of spring 270 is hooked to a pin 272 carried on a threaded rod 274. The rod 274 is threaded through a bracket 276 and secured by a pair of nuts 278. The spring 270 exerts constant tension on the strap 266 on pulley 265 and thus provides a braking force resisting rotation of the spindle 214. The braking force can be adjusted by adjusting the position of the threaded rod 274 to move pin 272.

The film compartment 204 is light tight. As shown in FIG. 5, the film compartment 204 is provided with upper and lower access doors 280 and 282, respectively. A hinge 284 connects the top edge of the upper door 280 with the film compartment and allows the upper door to be swung between open and closed positions. The closed position of door 280 is depicted in solid lines in FIG. 5, and the fully open position is depicted in broken lines. The free edge of door 280 is provided with an angled flange 286 which accommodates a similar bend configuration of the film compartment. The outside of the flange 286 is provided with a handle 288 to facilitate opening of the upper door 280. The main panel of door 280 is provided on its inside surface with a handle 290 which facilitates closing of the door. A magnet 292 is provided on the film compartment to serve as a latch which acts against the flange 286 in order to latch door 280 in its closed position.

The lower door 282 is connected with the side of the film compartment 204 by a hinge 294 which allows door 282 to be swung between open and closed positions. The fully open position is shown in broken lines in FIG. 5, while the closed position is shown in solid lines. Magnet 296 latches the door 282 in its closed position. In the closed position, the flange 286 of door 280 overlaps the top of door 282 to maintain the film compartment in a light tight condition. When the doors are open, they provide access to the film compartment for changing of the film.

As best shown in FIG. 1, the camera 10 is provided with a microprocessor terminal unit 298 which may be mounted on the front of the camera on a shelf 300 located above the feed leaf 24 and in front of the optical tower 170 at a convenient height and location for operator access. The terminal unit 298 includes a display screen 302 and suitable controls such as a keypad 304 and other control buttons 306.

FIG. 12 depicts in block diagram form a microprocessor based control system for controlling operation of the camera 10. A conventional microprocessor 308 has a suitable interface 310 with the terminal unit 302. A lamp on/off switch 314 provides another input to the terminal 302. Outputs from the terminal unit 302 control the top or front lights 160 and the back light 166 through suitable control circuits 316 and 318, respectively. The control circuit 316 adjusts the intensity of the top lights 160 under operator control, while the other control circuit 318 independently adjusts the intensity of the back light 166, also under operator control. Consequently, the desired ratio of the intensity of the front lights to the back lights can be adjusted to accommodate the characteristics of the document which is being photographed. This ratio may be expressed in percentage of full intensity.

Inputs include a slow forward (jog) input 320 which advances the document slowly while pressed for motion actuation to circumvent the microprocessor and, a slow reverse (jog) input 322 which reverses the document slowly while pressed, a start or trigger input 324 which initiates simultaneous advancement of the original document and the film at a speed previously set in the microprocessor, and a stop input 326 which stops all motion. When the system is in operation in a forward mode, motor 120 operates in a forward manner under the control of a conveyor motor drive forward block 328. A conventional encoder 330 is used to monitor the motor output shaft in the forward mode and provide feedback to the microprocessor 308. Block 332 is used in the reverse mode of operation of motor 120, and another encoder 334 is provided to monitor the motor shaft in the reverse mode and provide feedback to the microprocessor 308.

Under program control, the microprocessor 308 activates the film transport motor 234 in a manner that is precisely correlated to the speed of the conveyor motor 120. For example, if the image that is to be reproduced on the film 205 is ¼ the size of the original image on the document that is being photographed, the speed at which the film is advanced must be exactly ¼ as great as the speed at which the document is conveyed by the conveyor system 28. If the film is transported at a slower speed, the image on the film will be distorted such that it is shorter than it should be or compressed in one direction. Conversely, if the film is transported at a speed greater than it should be, the image on the film will be unduly long or extended in one direction. An encoder 336 monitors the film transport motor 234 and provides feedback to the microprocessor 308 so that suitable adjustments can be made to correlate the two drive motors. The shutter actuator 206 is controlled by the microprocessor 308 through block 338. The on/off state of the CCD camera 208 is controlled through block 340 independent of the microprocessor. Block 342 is a CCD camera control block which operates the CCD camera 210 and provides the image seen by the CCD camera on the monitor screen 302 of the terminal unit 298, or, in the alternative, on a separate monitor screen which is dedicated to the CCD camera.

In operation of the camera 10, the original large documents that are to be photographed are fed by the operator longitudinally through the inlet slot 34. The document that is entered into the camera is conveyed by the belts 46 through the space presented between the glass plates 144 and 146, and the belts 46 on the discharge side of the conveyor system discharge the document through the outlet side 36 and into the tray 30. The speed at which each document is conveyed by the conveyor system 28 is controlled by the conveyor drive motor 120 which is in turn controlled by the microprocessor 308. The microprocessor also operates the film drive motor 234 and controls its speed such that the speed of the film is accurately correlated to the document speed.

As the document passes between the glass plates 144 and 146, the front lights 160 generate light which is reflected from the front or top side of the document through the slit 186 and into the optical tower 170. At the same time, the bottom or back light 166 projects light through the document from the bottom to top or back to front, and the projected light enters the optical tower through the slit 186. It is noted that the slit 186 has a length dimension which is at least as great as the width dimension of the part of the document 22 which contains images that are to be photographed. It is likewise noted that the fluorescent lamps 160 and 166 are longer than the slit such that the entire width of the document is illuminated and light is reflected and projected through slit 186 across the entire width of the document.

The light is reflected from the first surface mirror 188 to the lens 190 and focused by the lens on the film 205. The film is thus exposed to the images on the document.

The document 22 is photographed in this fashion while it is moving, and only the part of the document which underlies the slit 186 is exposed to light at any one time. Then the document has been completely conveyed through the camera, its entire length will have been exposed, with the length being progressively photographed as the document is advanced by the conveyor system 28. The film 205 then contains a complete exposure which is accurate and reduced by a factor dependent upon the optical system. In all cases, the speed at which the film is advanced is closely correlated to the speed of the document, with the correlation factor dependent upon the size reduction factor of the photoreproduction process.

The special configuration of the slit 186 is important for accuracy in the photoreproduction process. Linear light sources such as the fluorescent lamps 160 and 166 are characterized by a somewhat greater light intensity near the center than near the opposite ends. Because the slit 186 is wider near the ends than near the center, compensation is made for this intensity variation along the length of the lamps. In addition, the slit configuration compensates for the inherent cosine fourth optical losses of the lens that occur near the perimeter of the image. The exact configuration of the slit 186 has been determined empirically to arrive at the optimum compensation for light intensity variations and cosine fourth losses. The diffuser panel 168 provides diffusion for the light from the back light element 166 and helps achieve uniformity in the back lighting intensity.

The mask 182 should be removable so that it can be replaced, under certain circumstances, with a mask having a different slit configuration. For example, there is a difference in the fluorescing characteristics of various fluorescent lamps and if the lamps are changed it may be necessary to widen or narrow the slit 186 at certain places to make for image uniformity across the strand of film. This determination normally must be empirically accomplished.

The provision of both front and back lighting is an important feature of the invention. While the front light elements 160 illuminate the front face of the document, they are ineffective in providing illumination for images that may be on the back side of the document and positionally related to the material on the front side. For example, if the front face of the document includes an architectural floor plan and the back face includes duct work or pipe layouts that are superimposed or otherwise positionally related to the floor plan, the back light 166 projects light through the document and thereby exposes the film to the images on the back of the document. Additionally, by projecting light through the document, the back light 166 sharpens the lines and other images on the front side even if there is no material borne on the back or underside of the document.

Integrated lighting on both sides of the original is commonly employed in engineering cameras such as those described in U.S. Pat. Nos. 3,639,054, 3,762,816 and 4,473,291. Exposure with those devices is made in a static situation with multiple front lights several feet from the original and the multiple back lights some 30 inches or more rearward of the original. If the back lights are too close to the original they will generate "hot spots" in the negative, overexposing locally.

In a flow camera, front and back lighting is not so simple. The original is moving but must remain almost perfectly flat to be in focus and the lights on both sides must be within a couple of inches of the original and must not be impeded in any way. At the moment of exposure, the original is "on its own". There cannot be any belts or other machine parts in the line of view. Glass plates 144 and 146 nursemaid the original during this critical instant, and their leading edges must not intercept the approaching edge of the original.

Through use of the camera 10, and through image enhancement techniques that can be used with a camera of this high quality, the film image is enhanced when compared to the image on the original document. Consequently, even poor quality documents can be reproduced by the camera in a manner to improve the quality enough that digital scanning can be used directly on the film negative in order to digitize the original document without the need for expensive and time consuming interactive operator enhancement techniques to be used in the scanning process and without the need for providing an enlargement of the film image for scanning purposes. Consequently, the camera of the present invention is particularly well suited for use in processes involving digitizing of large documents that are of low quality.

The CCD camera 210 provides on monitor screen 302 a view of the document as it passes under the slit 186. The operator can thereby visually monitor the document as it is being photographed, and the operator can take corrective measures if a transport problem develops. The image generated by the CCD camera can optionally be displayed on the microprocessor monitor 302.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative, and not in a limiting sense.

Having thus described the invention, what is claimed is:

1. A flow camera for reproducing an image on a sheet or document such as a large engineering drawing, map, or architectural plan while the sheet is in motion, said camera comprising:
   a frame presenting a slit through which light from the sheet can pass;
   means for conveying the sheet at a prescribed speed along a conveyor path carrying the sheet in proximity to said slit;
   front lighting means for applying light to a side of the sheet facing said slit for reflection of the light from said front lighting means off of the sheet and through said slit;
   back lighting means situated such that the sheet is between said slit and back lighting means to effect transmission of light from said back lighting means through the sheet and then through said slit;
   means for transporting a light sensitive medium at a speed having a selected relationship to said prescribed speed; and
   optical means for focusing, on said light sensitive medium the light reflected off of the sheet and through said slit from said front lighting means and the light transmitted through the sheet and said slit from said back lighting means.

2. A flow camera as set forth in claim 1, including:
   first and second transparent plates; and
   means on said frame for supporting said first and second plates apart from one another along said conveyor path at a location and orientation to allow the sheet to pass between said plates while maintaining the sheet in a plane parallel to the plane containing said slit, whereby the light from said front lighting means can pass through said first plate to reach the sheet and the light from said back lighting means can pass through said second plate to reach the sheet.

3. A flow camera as set forth in claim 2, wherein said conveying means includes a plurality of moving entry belts for feeding the sheet between said transparent plates and a plurality of moving discharge belts for pulling the sheet out of the space between said transparent plates, said discharge belts being spaced downstream from said entry belts to avoid blocking light emitted from said back lighting means toward the sheet as it passes between said transparent plates.

4. A flow camera as set forth in claim 3, including:
   a pair of entry guides spaced apart from one another and arranged to receive the sheet from said entry belts and guide the sheet into the space between said transparent plates; and
   a pair of discharge guides spaced apart from one another and arranged to receive the sheet from the space between said transparent plates and guide the sheet toward said discharge belts.

5. A flow camera as set forth in claim 4, wherein:
   said entry belts include a first set of belts and a second set of belts arranged to engage opposite surfaces of the sheet to propel it along said conveyor path, each set of entry belts including a plurality of belts spaced apart from one another in a direction transverse to the conveyor path; and
   said discharge belts include a first set of belts and a second set of belts arranged to engage opposite surfaces of the sheet to propel it along said conveyor path, each set of discharge belts including a plurality of belts spaced apart from one another in a direction transverse to the conveyor path.

6. A flow camera as set forth in claim 5, including a plurality of spaced apart fingers on said entry guides extending between the belts in both sets of entry belts.

7. A flow camera as set forth in claim 1, wherein said conveying means comprises:
   a plurality of moving entry belts comprising opposing sets of belts each including a plurality of belts which move adjacent to the opposing belts to convey the sheet along said conveyor path; and
   a plurality of moving discharge belts comprising opposing sets of belts spaced downstream from the entry belts and each including a plurality of belts which move adjacent to the opposing belts to convey the sheet along said conveyor path.

8. A flow camera as set forth in claim 7, including a curved belt support plate on the frame for said entry belts and another curved belt support plate for said discharge belts, said belt support plates being located and arranged to guide the belts in a manner to maintain the belts in opposing sets adjacent to one another for engagement against opposite surfaces of the sheet.

9. A flow camera as set forth in claim 1, wherein:
said optical means defines an optical axis;
said slit has a longitudinal axis substantially centered on and perpendicular to the optical axis; and
said slit has opposing side edges which curve in a divergent manner away from the optical axis to define opposite end portions of the slit which are wider than a center portion adjacent to the optical axis.

10. A flow camera as set forth in claim 1, wherein:
said slit has a length dimension which is oriented substantially perpendicular to the direction of movement of the sheet along said conveyor path and which is at least as great as the width dimension of the sheet;
said front lighting means comprises a pair of elongated light sources arranged generally parallel to the length dimension of the slit and situated at locations offset substantially equidistantly on opposite sides of an optical axis defined by said optical means; and
said back lighting means comprises a single elongated light source arranged generally parallel to the length dimension of the slit and in line with said optical axis.

11. A flow camera as set forth in claim 10, wherein said slit has opposing side edges which curve in a divergent manner away from the optical axis to define opposite end portions of the slit which are wider than a center portion adjacent to the optical axis.

12. A flow camera as set forth in claim 10, including means for adjusting the intensity of said pair of light sources and means for adjusting the intensity of said single light source independently of the adjusting means for said pair of light sources.

13. A flow camera as set forth in claim 1, including means for adjusting the intensity of the light from said front lighting means and means for adjusting the intensity of the light from said back lighting means independently of the adjusting means for the front lighting means.

14. A flow camera as set forth in claim 1, wherein said optical means comprises:
a substantially light tight film compartment for housing said light sensitive medium and transporting means therefor;
an objective lens mounted on the frame in a fixed position for focusing light on said medium;
an optical tower constructed of a plurality of massive plates resistant to vibrational forces and connected to form a light tight compartment in the tower; and
a single mirror mounted in a fixed position to said massive plates within the tower and oriented to reflect light from the sheet toward said lens.

15. A flow camera as set forth in claim 14, wherein:
said optical means defines an optical axis; and
said mirror is oriented to reflect light along said optical axis through an angle less than 90°.

16. A flow camera as set forth in claim 14, including:
a plurality of mirror support elements connected with said massive plates and defining a guide way into which said mirror can be slid to said fixed position and out of which said mirror can be slid for removal from the tower;
an access opening in one of said massive plates providing access to said mirror in the guideway; and
a removable cover normally closing said access opening in light tight fashion.

17. A flow camera as set forth in claim 1, wherein:
said light sensitive medium comprises film contained in a roll; and
said transporting means comprises power means for unrolling the film from said roll, transporting said film in a substantially planar form past an exposure station at which light from the sheet is focused on the film by said optical means, and winding the film onto a spool following exposure.

18. A flow camera as set forth in claim 17, wherein said transporting means comprises:
a rotatable spindle on which said film roll is received;
a rotatable capstan around which the film is drawn between said spindle and spool, said power means operating to rotate said spool and capstan to draw the film from said roll and wind the film onto said spool;
a pair of idlers between said spindle and capstan for maintaining the film in said substantially planar form as the film is advanced past the exposure station; and
slip means coupled with said spindle and spool for allowing slippage of the spindle and spool to accommodate variations in the diameter of the film wound on the spindle and spool.

19. In a flow camera which exposes a sheet or document such as a large engineering drawing, map, or architectural plan to light while the sheet is in motion at a prescribed speed and which has an optical system for reproducing an image on the sheet on film held in a roll, the improvement comprising:
a light tight film compartment on the camera;
a rotatable spindle in said film compartment for holding the roll of film and paying out the film;
a take up spool in the film compartment for receiving the exposed film;
a capstan mounted in said film compartment for rotation, said capstan presenting a high friction surface engaging the film between said spindle and spool to draw the film off of said roll upon rotation of the capstan;
a pair of idlers in the film compartment between said spindle and capstan, said idlers being arranged to hold the film in a planar form at an exposure station extending between the idlers for exposure of the film;
power means for driving said capstan and spool and maintaining the rotational speed of the capstan at a rate at which the film is advanced through said exposure stage at a constant speed having a selected relationship to said prescribed speed; and
slip means coupled with said spindle and spool for allowing the spindle and spool to slip to accommodate variations in the diameter of the film wound on the spindle and spool.

20. A flow camera for reproducing an image on a sheet or document such as a large engineering drawing, map, or architectural plan while the sheet is in motion, said camera comprising:
a frame presenting a slit through which light from the sheet can pass;

means for conveying the sheet at a prescribed speed along a conveyor path carrying the sheet in proximity to said slit;

lighting means for illuminating the sheet;

a single mirror for reflecting the light from the sheet;

means for transporting a light sensitive medium at a speed having a selected relationship to said prescribed speed; and optical means for focusing the light reflecting from said mirror on said light sensitive medium.

21. A flow camera for reproducing an image on a sheet or document such as a large engineering drawing, map, or architectural plan while the sheet is in motion, said camera comprising:

a frame;

a mask plate having an elongated slit therein;

means on said frame for releaseably receiving and holding said mask plate at a fixed position and yet allowing selective removal of the mask plate from the frame;

means for conveying the sheet at a prescribed speed along a conveyor path carrying the sheet in proximity to said slit;

means for applying light to the sheet in a manner to direct the light through the slit;

means for transporting a light sensitive medium at a speed having a selected relationship to said prescribed speed; and optical means for focusing the light passing through the slit on said light sensitive medium.

22. A flow camera for reproducing an image on a sheet or document such as a large engineering drawing, map, or architectural plan while the sheet is in motion, said camera comprising:

a frame presenting a slit through which light from the sheet can pass;

first and second sets of entry belts;

means for mounting said entry belts on the frame in a manner to situate opposing belts in the respective first and second sets in opposition to one another for conveying the sheet along a preselected path carrying the sheet in proximity to said slit, with said entry belts terminating at a location upstream from said slit;

first and second sets of discharge belts;

means for mounting said discharge belts on the frame in a manner to situate opposing discharge belts in the respective first and second sets thereof in opposition to one another for conveying the sheet away from the slit along said preselected path, with said discharge belts spaced downstream from said slit and from said entry belts to present a gap between the entry and discharge belts at a location adjacent to said slit;

means for driving said entry and discharge belts to effect conveyance of the sheet along said preselected path at a prescribed speed;

means for supporting the sheet in a planar form in said gap;

means for lighting the sheet in a manner to direct the light through said slit;

means for transporting a light sensitive medium at a speed having a selected relationship to said prescribed speed; and optical means for focusing the light passing through said slit on said light sensitive medium.

23. A flow camera as set forth in claim 22, wherein said supporting means comprises a pair of transparent plates on the frame spaced apart from one another adjacent to said gap and arranged to receive the sheet between said plates for support of the sheet in said gap.

24. A flow camera as set forth in claim 23, wherein said lighting means comprises:

front lighting means for applying light to a side of the sheet facing said slit for reflection of the light from said front lighting means off of the sheet and through said slit;

back lighting means situated such that the sheet is between said slit and back lighting means to effect transmission of light from said back lighting means through the sheet and then through said slit;

25. A flow camera for reproducing an image on a sheet or document such as a large engineering drawing, map, or architectural plan while the sheet is in motion, said camera comprising:

a frame presenting a slit through which light from the sheet can pass;

means for conveying the sheet at a prescribed speed along a conveyor path carrying the sheet in proximity to said slit;

means for lighting the sheet in a manner to direct the light through said slit;

a light tight optical tower on the frame at a location to receive the light passing through said slit;

a mirror;

means in said tower for providing a guideway into which said mirror can be inserted and held in a fixed position in the path of the light entering the tower through said slit, said mirror being selectively removable from said guideway and from said tower;

a film compartment on said frame;

means in said film compartment for receiving a light sensitive medium and transporting said medium at a speed having a selected relationship to said prescribed speed; and lens means for focusing the light reflected from said mirror onto said light sensitive medium.

26. A method of reproducing an image borne on a sheet or document such as a large engineering drawing, map, or architectural plan at a preselected size reduction, said method comprising the steps of:

conveying the sheet at a prescribed speed with the sheet held flat and traveling in a direction perpendicular to a transverse dimension of the sheet;

reflecting light from a front face of the sheet while the sheet is traveling at said prescribed speed;

projecting light through the sheet from a side opposite said front face;

focusing at an exposure station the light which reflects from the sheet and the light which is projected through the sheet; and transporting a light sensitive medium past said exposure station at a speed which has a correlation to said prescribed speed determined by said preselected size reduction.

27. The method of claim 26, wherein the light which is reflected from the sheet and projected through the sheet is directed through a slit having a length dimension oriented parallel to the transverse dimension of the sheet.

28. The method of claim 27, including the step of reflecting the light off of a single mirror prior to said focusing step.

29. The method of claim 28, wherein the light reflects off of said mirror at an angle less than 90°.

* * * * *